(12) United States Patent
Murakami et al.

(10) Patent No.: US 7,244,036 B2
(45) Date of Patent: Jul. 17, 2007

(54) VEHICULAR LAMP

(75) Inventors: Kentaro Murakami, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 235 days.

(21) Appl. No.: 11/057,606

(22) Filed: Feb. 14, 2005

(65) Prior Publication Data

US 2005/0179393 A1 Aug. 18, 2005

(30) Foreign Application Priority Data

Feb. 16, 2004 (JP) ............................. 2004-037870

(51) Int. Cl.
*F21V 19/04* (2006.01)
(52) U.S. Cl. ............... 362/20; 362/251; 362/276; 362/464; 362/543; 315/77; 315/80
(58) Field of Classification Search ................. 362/20, 362/251, 276, 295, 464, 543; 315/77, 80
See application file for complete search history.

(56) References Cited

U.S. PATENT DOCUMENTS 6,847,169 B2 * 1/2005 Ito et al. ...................... 315/77
7,105,945 B2 * 9/2006 Shiotsu et al. ............... 307/77

FOREIGN PATENT DOCUMENTS

JP 2002-231013 8/2002

OTHER PUBLICATIONS

Patent Abstracts of Japan, Publication No. 2002-231013 dated Aug. 16, 2002, 1 page.

* cited by examiner

*Primary Examiner*—Stephen F Husar
(74) *Attorney, Agent, or Firm*—Osha Liang LLP

(57) ABSTRACT

A vehicular lamp has light source units connected in parallel, an output controlling switch operable to intermittently carry an electric current by repeating on and off, an output coil operable to output electric power according to current flowing into said output controlling switch in synchronization when said output switch switches, a selection controlling unit operable to select at least one said light source unit in synchronization when said output controlling switch switches and cause said at least one selected light source to receive the power output from said output coil, and a malfunction detecting unit operable to detect malfunction of each of said light source units, wherein said selection controlling unit selects at least one said light source unit among said light source units from which malfunction is not detected when said malfunction detecting unit detects malfunction of either of said light source units.

7 Claims, 2 Drawing Sheets

VEHICULAR LAMP

This patent application claims priority from a Japanese Patent Application No. 2004-037870 filed on Feb. 16, 2004, the contents of which are incorporated herein by reference.

BACKGROUND OF THE INVENTION

1. Field of the Invention

The present invention relates to a vehicular lamp.

2. Description of Related Art

Conventionally, a vehicular lamp that uses a light-emitting diode element is known as disclosed, for example, in Japanese Patent Laid-Open No. 2002-231013. In some cases, a vehicular lamp uses a plurality of light-emitting diode elements, e.g., according to need in light distribution design.

In a vehicular lamp that uses a plurality of light-emitting diode elements, there was a problem that a circuit scale increases, e.g., to control each of the light-emitting diode elements independently, in some cases. In this way, a cost of a vehicular lamp also increased in some cases.

SUMMARY OF THE INVENTION

Therefore, it is an object of the present invention to provide a vehicular lamp that can solve the foregoing problems. The above and other objects can be achieved by combinations described in the independent claims. The dependent claims define further advantageous and exemplary combinations of the present invention.

According to the first aspect of the present invention, there is provided a vehicular lamp that is used for a vehicle. The vehicular lamp includes: a plurality of light source units that is connected in parallel; an output controlling switch operable to intermittently carry an electric current by repeating on and off; an output coil operable to output electric power according to the current flowing into the output controlling switch in synchronization with the timing when the output switch switches; a selection controlling unit operable to select at least one the light source unit in synchronization with the timing when the output controlling switch switches and cause the selected light source(s) to receive the power output from the output coil; and a malfunction detecting unit operable to detect malfunction of each of the plurality of light source units, in which the selection controlling unit selects at least one the light source unit among the light source units from which malfunction is not detected when the malfunction detecting unit detects malfunction of either of the light source units.

Additionally, the vehicular lamp may further include a plurality of light source side switches that is respectively provided in correspondence with each of the plurality of light source units and is serially connected with the corresponding light source units, in which the plurality of light source side switches may respectively supply the power output from the output coil to the corresponding light source units when being turned on, the selection controlling unit may turn on the light source side switch(s) corresponding to the selected light source unit(s) to cause that light source unit(s) to receive the power.

In addition, the malfunction detecting unit may include: a plurality of light-source malfunction detecting units that are respectively provided in correspondence with each of the plurality of light source units and respectively detects malfunction of the corresponding light source units; and a plurality of latch units that is respectively provided in correspondence with each of the plurality of light source units and respectively stores a predetermined value when the light-source malfunction detecting unit(s) detect(s) malfunction of the corresponding light source unit(s), and the selection controlling unit may turn on the light source side switch(s) corresponding to the latch unit(s) that is (are) not storing the predetermined value to cause the light source unit(s) from which malfunction is not detected to receive the power.

Further, each of the plurality of light source units may respectively include a semiconductor light-emitting element that emits light according to the power received from the output coil.

Furthermore, the vehicular lamp may further include a plurality of light source side switches that is respectively provided in correspondence with each of the plurality of light source units and is serially connected with the corresponding light source units, in which the plurality of light source side switches may respectively supply the power output from the output coil to the corresponding light source units when being turned on, the selection controlling unit may sequentially select each of the plurality of light source units and turn on the light source side switch corresponding to the selected light source unit to cause the light source unit to receive the power.

Moreover, the vehicular lamp may further include: a current detecting unit that detects the current flowing into each of the plurality of light source units; an output controlling unit that controls the output controlling switch, in which the selection controlling unit may repeatedly select each of the plurality of light source units, and the output controlling unit may change time for which the output controlling switch is held off just before the light source side switch corresponding to each of the light source units is turned on based on the current detected by the current detecting unit while the light source unit is being selected at a previous time.

Additionally, the vehicular lamp may further include an output controlling unit operable to stop the power output from the output coil by turning off the output controlling switch when malfunction is generated from either of the light source units, in which the output controlling unit may turn off the output controlling switch after at least one the light source side switch is turned on when either the light source side switch is off.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
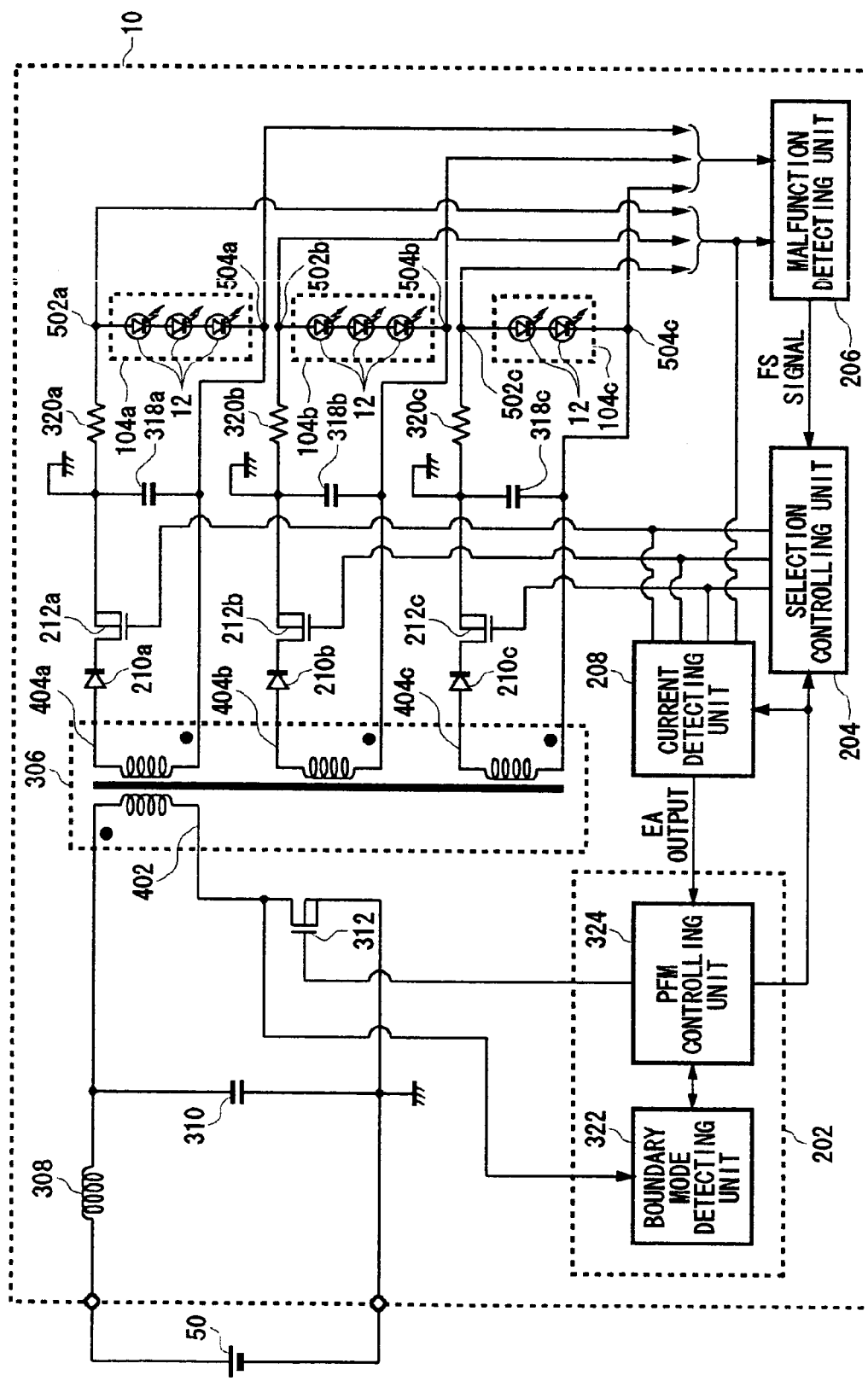
FIG. 1 is a diagram exemplary showing a configuration of a vehicular lamp according to an embodiment of the present invention.

FIG. 1 is a diagram exemplary showing a configuration of a vehicular lamp 10 according to an embodiment of the present invention along with a reference voltage power source 50. The reference voltage power source 50 is, e.g., a battery in a vehicle, and supplies a predetermined DC voltage to the vehicular lamp 10. In the vehicular lamp 10 of this example, it is an object to adequately illuminate a plurality of light source units 104a to 104c. In this example, the vehicular lamp 10 includes a plurality of light source units 104a to 104c, a coil 308, a condenser 310, an output controlling switch 312, a transformer 306, a plurality of diodes 210a to 210c, a plurality of light source side switches 212a to 212c, a plurality of condensers 318a to 318c, a plurality of series resistor 320a to 320c, a malfunction detecting unit 206, a selection controlling unit 204, a current detecting unit 208, and an output controlling unit 202.

The plurality of light source units 104a to 104c is connected in parallel with respect to the transformer 306, and respectively includes one or more light-emitting diode elements 12. In this example, the light source unit 104 is connected to a secondary coil 404 of the transformer 306 via the diode 210, the light source side switch 212, and the series resistor 320. In addition, the light-emitting diode element 12 is an example of a semiconductor light-emitting element, and emits light according to electric power received from the secondary coil 404 of the transformer 306.

Additionally, the light source units 104a to 104c may respectively have the different number of light-emitting diode elements 12. Further, the light source units 104a to 104c may have a plurality of light source rows connected in parallel. The light source row is a row consisting of, e.g., one or more light-emitting diode elements 12 connected in series.

The coil 308 is serially connected with the primary coil 402 of the transformer 306, and supplies an output voltage of the reference voltage power source 50 to the transformer 306. The condenser 310 smoothes the voltage supplied to the transformer 306. The output controlling switch 312 makes up a switching regulator along with the transformer 306, and is serially connected with the primary coil 402 of the transformer 306. In addition, the output controlling switch 312 intermittently streams an electric current by repeating on and off according to the control of the output controlling unit 202. In this way, the output controlling switch 312 intermittently changes the current flowing into the primary coil 402.

The transformer 306 has the primary coil 402 and the plurality of secondary coils 404a to 404c. When the output controlling switch 312 is turned on, the primary coil 402 streams the current received from the condenser 310. The plurality of secondary coils 404a to 404c is provided corresponding to the plurality of light source units 104a to 104c, and applies the voltage according to the current flowing into the primary coil 402 to the corresponding light source units 104 via the diodes 210, the light source side switches 212, and the series resistors 320. In this way, the secondary coils 404 output the electric power according to the current flowing into the output controlling switch 312 in synchronization with the timing in which the output controlling switch 312 switches.

In addition, the secondary coils 404 are an example of an output coil. The plurality of secondary coils 404a to 404c may respectively have the number of turns different from each other. In this case, each of the secondary coils 404a to 404c respectively outputs the voltage different from each other according to the number of turns. In this example, the secondary coils 404 also accumulate energy while the output controlling switch 312 is turned on, and then discharge the accumulated energy while the output controlling switch 312 is turned off.

Each of the plurality of diodes 210a to 210c is a rectifier diode. The plurality of diodes 210a to 210c is respectively provided corresponding to the plurality of light source units 104a to 104c, and is connected between the secondary coils 404 and the light source units 104 in the forward direction. In this example, the diodes 210 are provided between the corresponding secondary coils 404 and the light source side switches 212. In this way, when the corresponding light source side switch 212 is turned on, the diode 210 supplies the power output from the corresponding secondary coil 404 to the corresponding light source unit 104 via the light source side switch 212 and the series resistor 320.

In addition, the diode 210 is an example of a semiconductor device. In another example, the vehicular lamp 10 may further include the other semiconductor devices. This semiconductor device may be, e.g., a MOS transistor connected to the diode 210 in parallel. In this case, this MOS transistor is turned on in synchronization with the timing in which the diode 210 streams the current.

The plurality of light source side switches 212a to 212c is a switching element for energy propagation from the transformer 306 to the plurality of light source units 104a to 104c. Each of the plurality of light source side switches 212a to 212c is provided corresponding to each of the plurality of light source units 104a to 104c, and is serially connected with the corresponding light source unit 104. In this example, the light source side switches 212 are provided between the corresponding diodes 210 and series resistors 320, and are turned on and off according to the control of the selection controlling unit 204. In this way, when the light source side switches 212 are turned on, the light source side switches 212 respectively supply the power output from the secondary coils 404 to the corresponding light source units 104.

The plurality of condensers 318a to 318c and the plurality of series resistors 320a to 320c are provided corresponding to the plurality of light source units 104a to 104c. The condensers 318 smooth the current flowing into the corresponding light source units 104. In addition, the series resistors 320 are serially connected to the corresponding light source units 104, and produce the voltage according to the current flowing into the corresponding light source units 104 on both ends.

In this example, the series resistors 320 are connected to upper edges 502 side of the light source units 104, and are grounded at edges distant from the light source units 104. In this case, the secondary coils 404 output a negative voltage. In another example, the series resistors 320 may be connected to lower edges 504 side of the light source units 104. In this case, the secondary coils 404 output a positive voltage.

The malfunction detecting unit 206 is connected to the upper edge 502 and lower edge 504 of each of the light source units 104, and detects a voltage on the both ends of each of the light source units 104 based on electric potential in each of the upper edge 502 and lower edge 504. Then, the malfunction detecting unit 206 detects malfunction in each of the plurality of light source units 104 based on the detected voltage. For example, when the voltage on the both ends of the light source unit 104 is larger than a predetermined upper limit or smaller than a predetermined lower limit, the malfunction detecting unit 206 decides that this light source unit 104 is abnormal.

The selection controlling unit 204 selects the light source unit(s) 104 that should be lighted according to a driving signal received from the output controlling unit 202. Then, the selection controlling unit 204 turns on the light source side switch(s) 212 corresponding to the light source unit(s) 104 to be selected. In this way, the selection controlling unit 204 causes the selected light source unit(s) 104 to receive the power output from the secondary coil(s) 404 corresponding to the light source unit(s) 104 to be selected.

Here, when the malfunction detecting unit 206 detects malfunction of either of the light source units 104, the selection controlling unit 204 selects at least one light source unit 104 among the light source units 104 in which malfunction is not detected. In this way, when malfunction occurs in either of the light source units 104, it is possible to adequately decide which light source unit 104 is abnormal and stop energy propagation to that light source unit 104.

Further, in this example, the selection controlling unit 204 simultaneously selects all the light source units 104 in which the malfunction detecting unit 206 does not detect malfunction. In this case, each of the plurality of secondary coils 404 simultaneously supplies electric power to each of the corresponding light source units 104. In another example, the selection controlling unit 204 may sequentially select each of the light source units 104 in which malfunction is not detected according to the driving signal one by one. In this case, each of the plurality of secondary coils 404 supplies electric power to each of the corresponding light source units 104 in turn. In addition, in this case, the transformer 306 may have one secondary coil 404 commonly provided for the plurality of light source units 104.

Moreover, in this example, the output controlling unit 202 outputs the driving signal in synchronization with the timing in which the output controlling switch 312 switches. In this way, the selection controlling unit 204 selects the light source unit(s) 104 in synchronization with the timing in which the output controlling switch 312 switches.

The current detecting unit 208 receives the voltage occurring on the both ends of each of the plurality of series resistors 320a to 320c via the upper edges 502a to 520c of the plurality of light source units 104a to 104c. Then, the current detecting unit 208 detects the current flowing into the light source unit 104 corresponding to the series resistor 320 based on the voltage on the both ends of each of the series resistors 320. In this example, the current detecting unit 208 detects the current flowing into the light source unit 104 selected by the selection controlling unit 204 according to the driving signal received from the output controlling unit 202.

In addition, in this example, the current detecting unit 208 is an error amplifier, and informs the output controlling unit 202 of a comparison result (an EA output) between the current flowing into the light source unit 104 and a predetermined value. Further, each of the series resistors 320 has value of resistance that is inverse ratio of current ratio of the current flowing into the corresponding light source unit 104. Therefore, in this example, each of the series resistors 320 generates a substantially equivalent voltage on its both ends according to the current flowing into the corresponding light source unit 104. In this case, the current flowing into each of the light source units 104 can be controlled by constantly controlling mean values of the voltages occurring on the both ends of each of the series resistors 320. The current detecting unit 208 may inform the output controlling unit 202 of a comparison result between the mean values of the voltages occurring on the both ends of the series resistors 320 and a predetermined value.

The output controlling unit 202 includes a boundary mode detecting unit 322 and a PFM controlling unit 324. The boundary mode detecting unit 322 receives an inversion signal of the driving signal from the PFM controlling unit 324, and detects a current bound of the secondary coils 404 according to this inversion signal. The current bound of the secondary coil 404 is, e.g., the timing when the current flowing into the secondary coils 404 becomes smaller than a predetermined threshold current. This means the timing when energies accumulated in the transformer 306 have completely been discharged. In the timing or after that, the output controlling switch 312 is turned off.

The PFM controlling unit 324 controls the output controlling switch 312 by the well-known PFM control according to the output of the current detecting unit 208. In addition, the PFM controlling unit 324 supplies a driving signal synchronous with the timing in which the output controlling switch 312 switches to the selection controlling unit 204 and the current detecting unit 208. According to this example, it is possible to adequately control the current flowing into the plurality of light source units 104. Further, in another example, the output controlling unit 202 may control the output controlling switch 312, e.g., by the well-known pulse-width modulation control.

According to this example, the security of the vehicular lamp 10 can be raised by stopping energy propagation to the light source unit 104 in which malfunction has been detected. In addition, fault redundancy can be raised by maintaining lighting of the light source unit(s) 104 in which malfunction is not detected.

In another example, it is conceivable that security and redundancy are raised by providing, e.g., the individual transformer 306 for each of the plurality of light source units 104. However, in this case, since the number of components that can not be integrated increases, a cost of the vehicular lamp 10 rises. However, according to this example, security and redundancy can be raised even in case of using one transformer 306 and a plurality of light source units 104. In this way, the vehicular lamp 10 can also be offered at low cost.

In addition, a control circuit such as the malfunction detecting unit 206 and the selection controlling unit 204 can be integrated in contrast to a power series circuit such as the transformer. Therefore, for example, although the selection controlling unit 204 and so on are newly provided, a cost of the vehicular lamp 10 does not rise. In addition, the whole or a part of a control circuit such as the malfunction detecting unit 206, the selection controlling unit 204, the current detecting unit 208, and the output controlling unit 202 may be made up of, e.g., a microcomputer.

Figure 2:
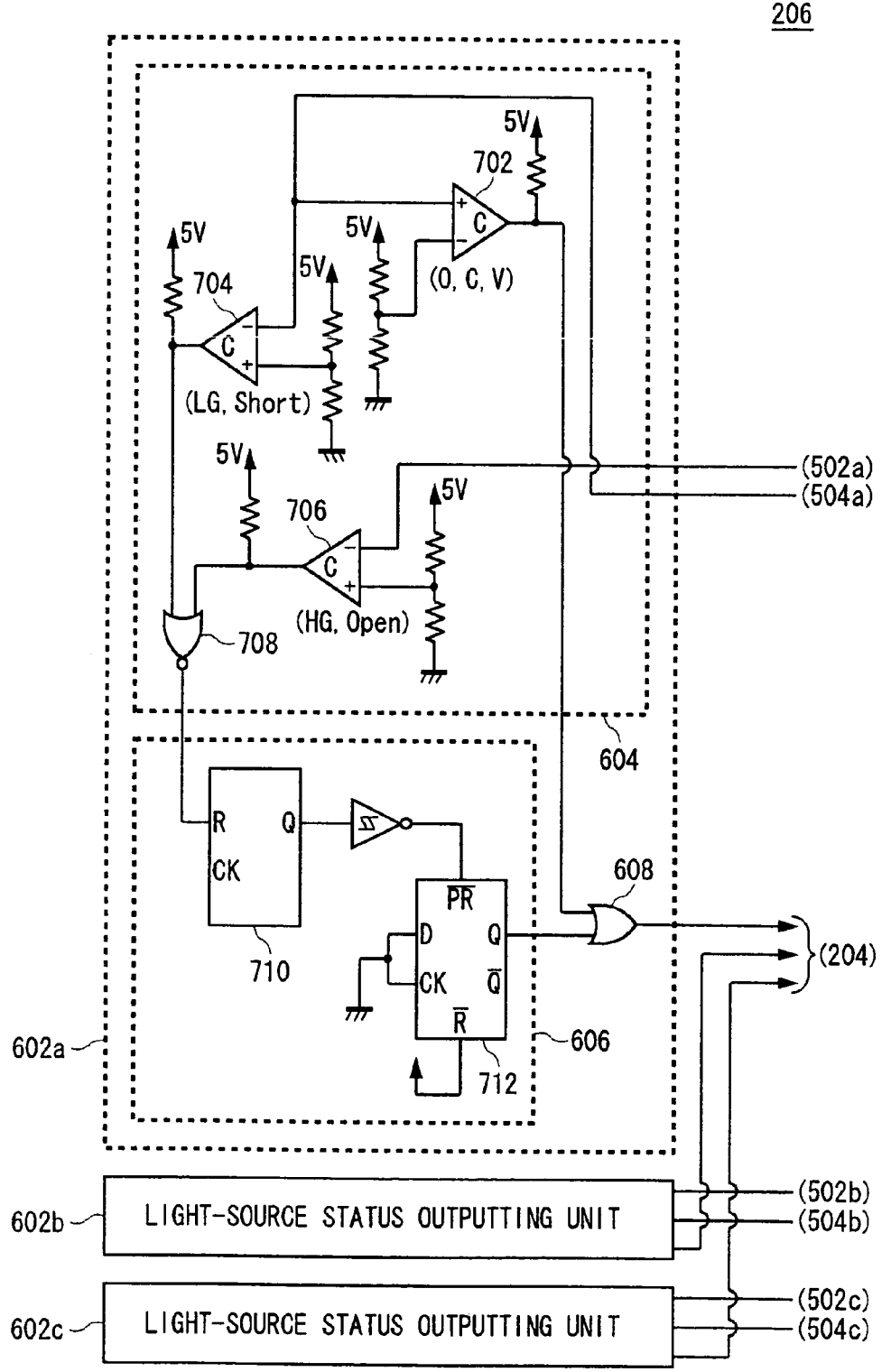
FIG. 2 is a diagram exemplary showing a configuration of a malfunction detecting unit.

FIG. 2 is a diagram exemplary showing a configuration of the malfunction detecting unit 206. In this example, the malfunction detecting unit 206 has a plurality of light-source status outputting units 602a to 602c that is provided respectively corresponding to each of the plurality of light source units 104a to 104c. The light-source status outputting unit 602 includes a light-source malfunction detecting unit 604, a latch unit 606, and an OR circuit 608.

The light-source malfunction detecting unit 604 includes a plurality of comparators 702, 704, and 706, a NOR circuit 708, and a plurality of resistors. In this example, the outputs of the comparators 702, 704, and 706 are pulled-up through the resistors.

The comparator 702 receives the voltage of the lower edge 504 of the corresponding light source unit 104 via a positive input and receives a predetermined reference voltage via a negative input. This reference voltage is a voltage corresponding to a predetermined upper limit with respect to the voltage of the both ends of the light source unit 104. In addition, the voltage of the lower edge 504 is, e.g., a voltage equal to absolute value of electric potential of the lower edge 504. In this way, when the voltage of the both ends of the light source unit 104 exceeds the predetermined upper limit, the comparator 702 turns over its output to H. Therefore, for example, when OCV (over circuit voltage) malfunction occurs in the voltage that is supplied to the vehicular lamp 10, the comparator 702 turns over the output.

The comparator 704 receives a predetermined reference voltage via a positive input and receives the voltage of the lower edge 504 of the corresponding light source unit 104 via a negative input. This reference voltage is a voltage corresponding to a predetermined lower limit with respect to the voltage on the both ends of the light source unit 104. In this way, when the voltage on the both ends of the light source unit 104 is lower than the predetermined lower limit, the comparator 704 turns over its output to H. Therefore, when the lower edge 504 that is a high voltage side terminal to receive a negative voltage is grounded (LG) or is short-circuited in the light source unit 104, the comparator 704 turns over the output.

The comparator 706 receives a predetermined reference voltage via a positive input and receives the voltage of the upper edge 502 of the corresponding light source unit 104 via a negative input. This reference voltage is a voltage smaller than the voltage of the upper edge 502 in a normal state. In addition, the voltage of the upper edge 502 is, e.g., a voltage equal to absolute value of electric potential of the upper edge 502. In this way, when the potential of the upper edge 502 comes close to a ground potential, the comparator 706 turns over its output to H. Therefore, when the upper edge 502 in the light source unit 104 is grounded (HG) or breaks (OPEN), the comparator 706 turns over the output.

The NOR circuit 708 outputs the result of a NOR operation with respect to the outputs of the comparator 704 and the comparator 706. In this way, when the lower edge 504 in the light source unit 104 is grounded (LG) or is short-circuited, or when the upper edge 502 in the light source unit 104 is grounded (HG) or breaks (OPEN), the NOR circuit 708 turns over its output to L. In this way, the light-source malfunction detecting unit 604 detects malfunction of the corresponding light source unit 104.

The latch unit 606 includes a counter 710, a flip-flop 712, and a Schmidt trigger inverter. The counter 710 delays an output of the NOR circuit 708 for a predetermined time, and then outputs the delayed result. In this case, when malfunction of the light source unit 104 continues more than a predetermined time, the counter 710 turns over an output. In this way, it is possible to prevent that a brief noise or the like is erroneously decided on malfunction of the light source unit 104.

The flip-flop 712 receives and stores the output of the counter 710 through the Schmidt trigger inverter. In this way, when the light-source malfunction detecting unit 604 detects malfunction of the corresponding light source unit 104, the latch unit 606 respectively stores a predetermined value. It is preferable that the once stored value is held as long as the power source of the vehicular lamp 10 is not switched on again. Further, the flip-flop 712 supplies the stored value to the selection controlling unit 204 via the OR circuit. In addition, in this example, when malfunction is detected from the corresponding light source unit 104, the flip-flop 712 outputs H.

In this case, the selection controlling unit 204 causes the light source unit 104 in which malfunction is not detected to receive electric power by turning on the light source side switch 212 (see FIG. 1) corresponding to the latch unit 606 on which a predetermined value is not stored. In this way, for example, when the light-source status outputting unit 602a corresponding to the light source unit 104a detects malfunction, the selection controlling unit 204 turns on the light source side switches 212b and 212c corresponding to the light source units 104b and 104c. In addition, for example, when the light-source status outputting units 602a and 602c corresponding to the plurality of light source units 104a and 104c detect malfunction, the selection controlling unit 204 turns on the light source side switch 212b corresponding to the light source unit 104b. According to this example, it is possible to adequately select and light the light source unit(s) 104 in which the malfunction does not occur.

In addition, in this example, the OR circuit 608 supplies the result of an OR operation with respect to the outputs of the comparator 702 and the flip-flop 712 to the selection controlling unit 204. Therefore, according to this example, fail safe control can further be performed with respect to the OCV malfunction that is malfunction of an input voltage. Further, in this case, when the OCV malfunction is dissolved, the malfunction detecting unit 206 does not detect malfunction of the light source unit 104. In another example, the detection results of the OCV malfunction may be held in, e.g., a flip-flop.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A vehicular lamp that is used for a vehicle, comprising:
a plurality of light source units connected in parallel;
an output controlling switch operable to intermittently carry an electric current by repeating on and off;
an output coil operable to output electric power according to current flowing into said output controlling switch in synchronization when said output switch switches;
a selection controlling unit operable to select at least one said light source unit in synchronization with when said output controlling switch switches and cause said selected light source to receive power output from said output coil; and
a malfunction detecting unit operable to detect malfunction of each of said plurality of light source units, wherein said selection controlling unit selects at least one said light source unit among said light source units from which malfunction is not detected when said malfunction detecting unit detects malfunction of either of said light source units.

2. The vehicular lamp as claimed in claim 1, further comprising a plurality of light source side switches respectively provided in correspondence with each of said plurality of light source units and serially connected with said corresponding light source units, wherein said plurality of light source side switches respectively supplies the power output from said output coil to said corresponding light source units when being turned on, wherein said selection controlling unit turns on said light source side switch corresponding to said selected light source unit to cause said selected light source unit to receive power.

3. The vehicular lamp as claimed in claim 2, wherein said malfunction detecting unit comprises:
   a plurality of light-source malfunction detecting units respectively provided in correspondence with each of said plurality of light source units that respectively detect malfunction of said corresponding light source units; and
   a plurality of latch units respectively provided in correspondence with each of said plurality of light source units that and respectively store a predetermined value when a light-source malfunction detecting unit detects malfunction of said corresponding light source unit, and said selection controlling unit turns on said light source side switches corresponding to a latch unit that is not storing the predetermined value to cause said light source unit from which malfunction is not detected to receive power.

4. The vehicular lamp as claimed in claim 1, wherein each of said plurality of light source units respectively includes a semiconductor light-emitting element that emits light according to the power received from said output coil.

5. The vehicular lamp as claimed in claim 1, further comprising a plurality of light source side switches respectively provided in correspondence with each of said plurality of light source units and serially connected with said corresponding light source units, said plurality of light source side switches respectively supplies the power output from said output coil to said corresponding light source units when being turned on, wherein said selection controlling unit sequentially selects each of said plurality of light source units and turns on said light source side switch corresponding to said selected light source unit to cause said light source unit to receive power.

6. The vehicular lamp as claimed in claim 1, further comprising:
   a current detecting unit that detects current flowing into each of said plurality of light source units; and
   an output controlling unit that controls said output controlling switch, wherein
      said selection controlling unit repeatedly selects each of said plurality of light source units, and
      said output controlling unit changes a time for which said output controlling switch is held off just before said light source side switch corresponding to each of said light source units is turned on based on the current detected by said current detecting unit while said light source unit is being selected at a previous time.

7. The vehicular lamp as claimed in claim 1, further comprising an output controlling unit operable to stop the power output from said output coil by turning off said output controlling switch when a malfunction is generated from either of said light source units, wherein said output controlling unit turns off said output controlling switch after at least one said light source side switch is turned on when all said light source side switches are off.

* * * * *